United States Patent [19]

Lorenz

[11] Patent Number: 4,928,012

[45] Date of Patent: May 22, 1990

[54] SYSTEM FOR MEASURING ELECTROMAGNETIC RADIATION ORIGINATING FROM THE HEMISPHERE

[75] Inventor: Dieter Lorenz, Hohenpeissenberg, Fed. Rep. of Germany

[73] Assignee: Deutsche Forschungs- und Versuchsanstalt fur Luft- und Raumfahrt e.V., Cologne, Fed. Rep. of Germany

[21] Appl. No.: 425,512

[22] Filed: Oct. 19, 1989

Related U.S. Application Data

[63] Continuation of Ser. No. 747,724, Jun. 21, 1985, abandoned.

[30] Foreign Application Priority Data

Jun. 26, 1984 [DE] Fed. Rep. of Germany ....... 3423494

[51] Int. Cl.$^5$ .............................................. G01J 1/04
[52] U.S. Cl. ............................ 250/338.1; 250/351; 250/352
[58] Field of Search .................. 250/332.1, 351, 352; 350/272, 273, 274

[56] References Cited

U.S. PATENT DOCUMENTS

| | | | |
|---|---|---|---|
| 2,994,053 | 7/1961 | De Waard | 250/338 |
| 3,097,300 | 7/1963 | Warmser et al. | 250/351 |
| 3,563,658 | 2/1971 | Dreyfus | 250/351 |

*Primary Examiner*—Carolyn E. Fields
*Assistant Examiner*—David P. Porte
*Attorney, Agent, or Firm*—Collard, Roe & Galgano

[57] ABSTRACT

A system for measuring electromagnetic radiation originating from the hemisphere corresponding to a solid angle of $2\pi$ is provided wherein a highly sensitive low-inertia detector is disposed below a transmissive dome and wherein the chopped light detection method is utilized. There are provided above the transmissive dome two similarly or differently designed modulators which are in the shape of dome segments and which are fitted into each other. At least one of the modulators rotates about their common vertical axis or the modulators may both rotate about the common vertical axis, either at the same or a different speed in the same direction or in opposite directions.

14 Claims, 4 Drawing Sheets

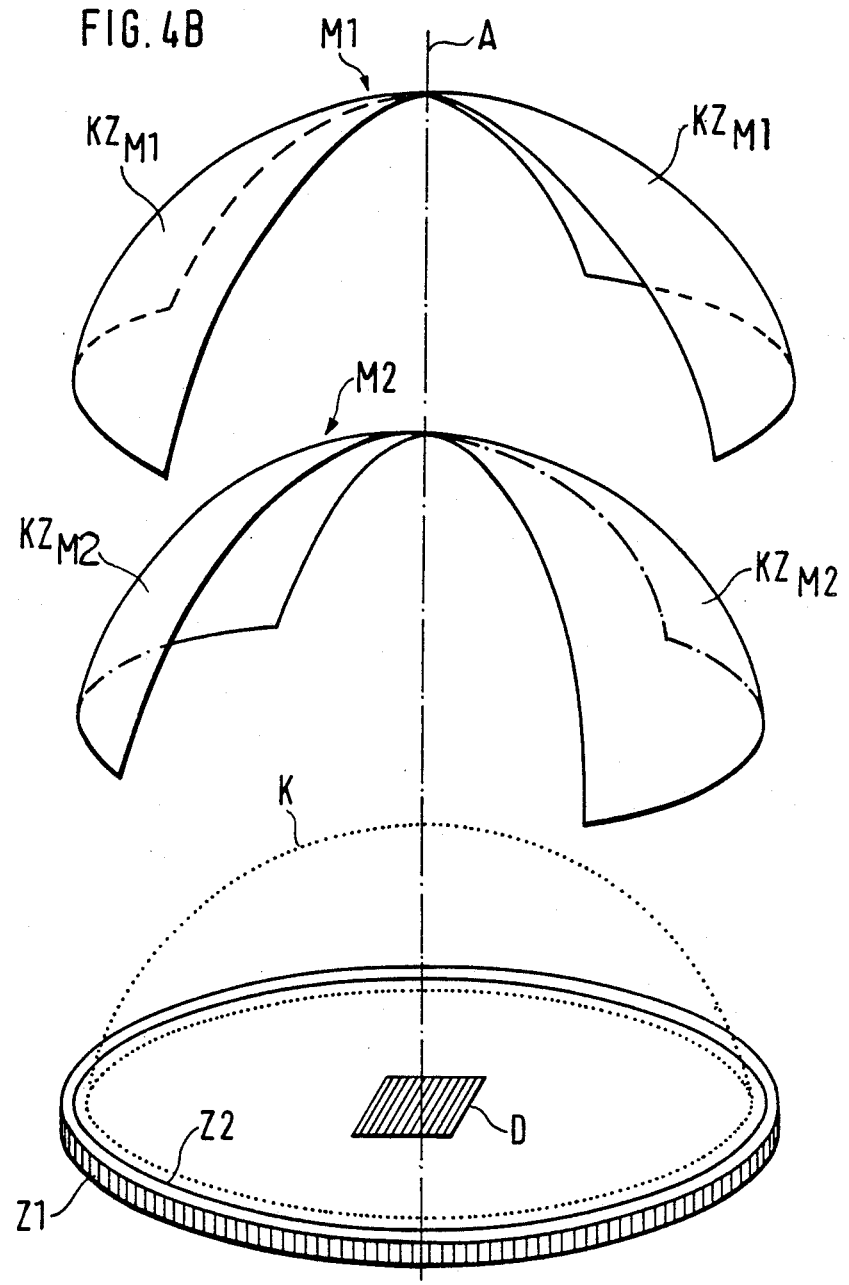

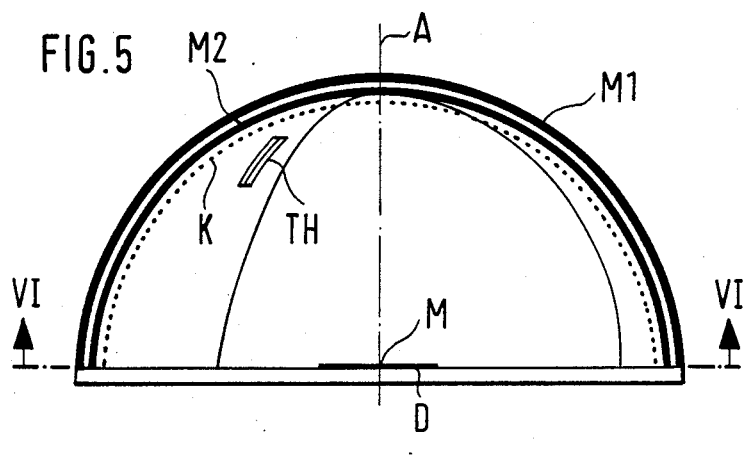
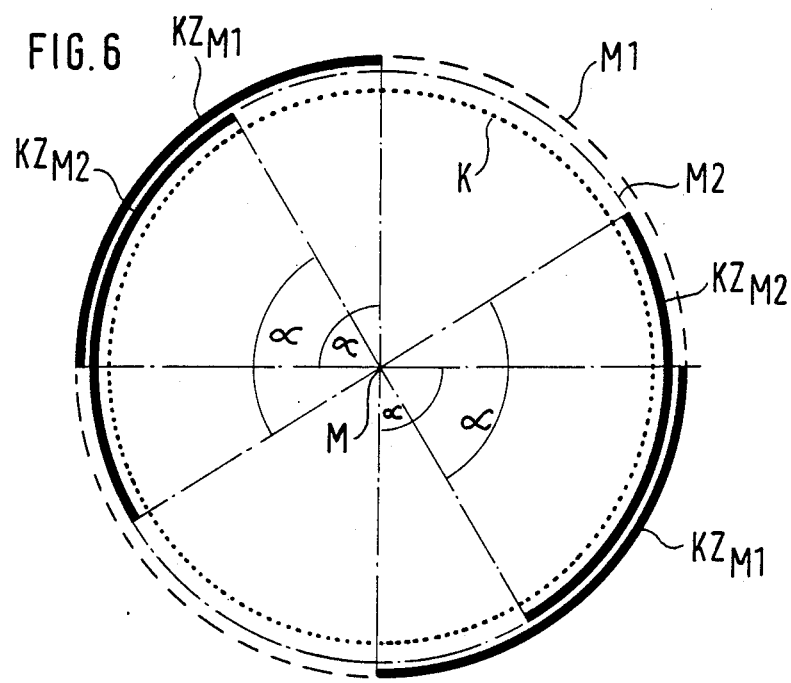

SYSTEM FOR MEASURING ELECTROMAGNETIC RADIATION ORIGINATING FROM THE HEMISPHERE

REFERENCE TO RELATED APPLICATIONS

This is a continuation application of application Ser. No. 747,724, filed June 21, 1985, entitled "A System For Measuring Electromagnetic Radiation Originating From the Atmosphere", now abandoned.

BACKGROUND OF THE INVENTION

1. Field of the Invention

The present invention relates to a system for measuring electromagnetic radiation originating from the hemisphere (corresponding to a solid angle of $2\pi$).

2. Description of the Prior Art

In the meteorological field, among others, measurement of solar and terrestrial radiation is conducted over wave lengths ranging between approximately 0.3 $\mu$m to 3 $\mu$m, and from 3 $\mu$m to 100 $\mu$m, respectively, so as to determine the radiation balance, i.e. the difference between radiation incident on the earth's surface and radiation emitted or reflected thereby, as well as the radiation components. For this purpose, any radiation from the upper and lower hemisphere (each corresponding to a solid angle of $2\pi$) must be detected and measured. Presently, such measuring operations are conducted not only by stationary means but, to an ever increasing degree, also with the aid of aircraft or spacecraft.

Heretofore, many different types of devices have been proposed for such measuring operations. As diagrammatically shown in FIG. 1, such a device may comprise for example a thermopile T, the horizontally disposed active soldered joints of which are blackened and insulated against the remaining component parts of the device. On incidence of radiation, the temperature of the active soldered joints rises above the temperature of the passive soldered joints, the latter being in thermal connection to a relatively large mass of the device. The resulting thermoelectric voltage, optionally together with other measured variables such as the temperature of passive soldered joints, serves as a measure of incident radiation. To prevent heat exchange with the surrounding atmosphere either by advection or convection, thermopile T is usually covered by a protective dome made of a material that is transmissive of the radiation to be measured, such as glass, polyethylene or the like. To secure even better protection against heat exchange, thermopile T may be covered by two hemispherical domes K1 and K2 according to a different conventional embodiment, both domes being again made of a transmissive material.

Devices of the above type operating by continuous light detection not only show relatively high inertia which is noticeable e.g. on use in aircraft; it is a particular disadvantage of such devices that variations in the temperature of the device itself and especially in the temperature of the not completely transparent domes may have a strong effect on the measuring signal. It was to minimize this effect that installation of the two concentric domes K1 and K2 shown in FIG. 2 was proposed.

The disadvantages of the prior art devices caused by their inertia and the effect of temperature on casing and dome might be overcome by employing the so-called chopped-light detection method. This method is state of the art but hitherto it could not be used for measuring radiation from the hemisphere (corresponding to a solid angle of $2\pi$), being suited only for devices having a limited aperture angle.

A system employing the conventional chopped-light detection method is shown in FIG. 3 and includes a radiation detector D of high sensitivity and very low inertia, e.g. a semiconductor bolometer, photoelectric cell, or pyroelectric detector, mounted behind an oscillating or rotating chopper MS which alternately covers and exposes detector D to radiation. According to the embodiment of FIG. 3, radiation is concentrated by means of a lens system 0 positioned in front of detector D. In this conventional embodiment, there is generated at detector D either alternating voltage or alternating current corresponding to the difference between radiation measured and radiation emitted and/or reflected by modulator disk MS (the latter being the so-called comparative radiation). It is an advantage of the above method that emission changes within the system (i.e. at detector, casing, window or optical system), due for example to temperature variations, have the same effect on measured radiation and comparative radiation and, thus, will not be impressed on either alternating voltage or alternating current. Some disadvantage may still be seen in the fact that the radiation emitted and/or reflected by the modulator disk must be known as it constitutes the reference signal (zero signal).

SUMMARY OF THE INVENTION

It is an object of the present invention to substantially overcome the disadvantages of the prior art devices and provide a system for measuring electromagnetic radiation originating from the hemisphere (corresponding to a solid angle of $2\pi$), said system permitting measurements of far greater accuracy than hitherto possible with the aid of the so-called continuous light detection method while showing markedly lower inertia if compared to the conventional continuous light detection method.

The above objects are accomplished in accordance with the present invention by a system for measuring electromagnetic radiation originating from the hemisphere, corresponding to a solid angle of $2\pi$, comprising two similarly or differently constructed modulators in the form of dome segments, the modulators are fitted into each other and encircle a dome. If in accordance with a preferred embodiment of the system of the invention, one of the modulators were stationary while the other rotated about the common vertical axis, modulation would be such as to generate at the one or more horizontally arranged and highly sensitive detectors, e.g. bolometers or photoelectric cells, an alternating voltage corresponding to the difference between radiation originating from the hemisphere and, provided the modulators are non-transmissive as well as non-reflective, characteristic radiation of the modulator. In this case, only half the radiation from the hemisphere would become effective as the other half would be constantly concealed. This is of no particular disadvantage when only specific portions of the hemisphere are to be surveyed. The resulting 50% loss in sensitivity would be quite tolerable in such cases.

Of course, such partial coverage cannot be tolerated if the entire hemisphere is to be surveyed. In this case, both of the modulators in form of dome segments must rotate about the common vertical axis, either in the same direction at different speed or in opposite directions at equal or different speed. In this instance, too, 50% of the hemisphere will be concealed, but there will be a constant change in concealed sectors so that, on the average and over a number of periods of time, the entire hemisphere will be surveyed.

Frequency of modulation may be accommodated to the desired measurement operation by properly selecting the form and number of sectors as well as the speed of rotation; the same is true for transmissivity, emissivity and reflectivity of the modulators. According to a preferred embodiment of the invention, the two modulators in the form or shape of dome segments possess an accurately defined transmissivity, emissivity and/or reflectivity, all of which are preferably wave length dependent.

When used in the chopped light detection method for measuring electromagnetic radiation originating from the hemisphere corresponding to a solid angle of $2\pi$, the system according to the present invention offers markedly greater accuracy in measuring than the conventional and widely accepted continuous light detection methods. Moreover, the system of the present invention is considerably lower in inertia.

Other objects and features of the present invention will become apparent from the following detailed description considered in connection with the accompanying drawings It is to be understood, however, that the drawings are designed as an illustration only and not as a definition of the limits of the invention.

BRIEF DESCRIPTION OF THE DRAWINGS

In the drawings wherein similar reference characters denote similar elements throughout the several views'

FIG. 4B is a perspective view similar to FIG. 4A, showing the various component parts of the system;

FIG. 5 is a vertical cross-sectional view through the system shown in FIGS. 4A and 4B; and FIG. 6 is a sectional plan view of the system shown in FIG. 4A, taken along line VI—VI of FIGS. 4A and 5.

DESCRIPTION OF THE PREFERRED EMBODIMENT

Figure 1:
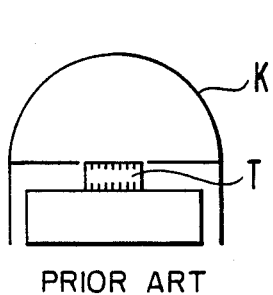
FIGS. 1 and 2 are diagrammatic representations of detecting devices comprising at least one thermopile disposed below a dome according to the prior art.
Figure 2:
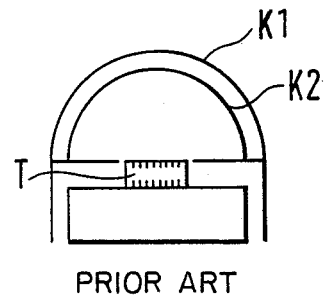
Figure 3:
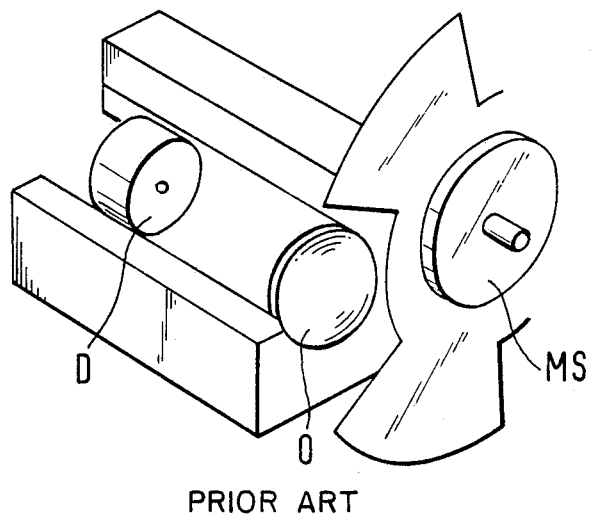
FIG. 3 is a perspective view of a detecting device operating according to the chopped light detection method according to the prior art.
Figure 4A:
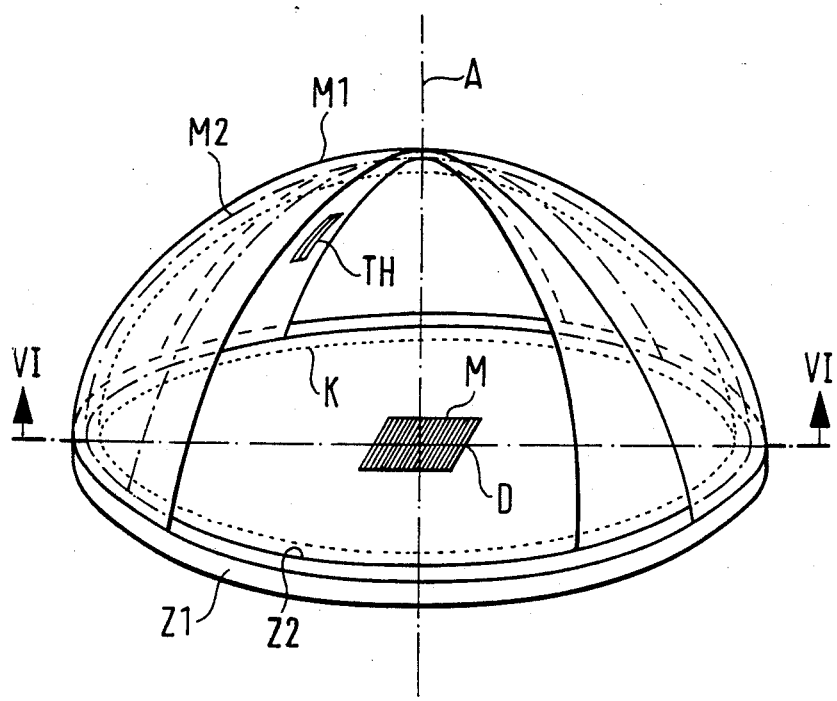
FIG. 4A is a partly sectional view of the system according to the present invention for measuring radiation from the hemisphere.

Now turning to the drawings, there is shown in FIGS. 4A, 4B, 5 and 6 a system for measuring electromagnetic radiation originating from the hemisphere which is particularly suited for meteorological measurement operations One or more highly sensitive low-inertia detectors D, e.g. bolometers, are disposed below a transmissive dome K, preferably in symmetrical arrangement around dome center M. Dome K is encircled by two modulators M1 and M2 of a similar design which are fitted to each other and are preferably formed as wing-like sections $KZ_{M1}$ and $KZ_{M2}$ resembling segments of the dome, as clearly seen in FIG. 4B. These modulators M1 and M2 in the shape of dome segments are assembled in such a manner that at least one of the modulators rotates about their common vertical axis A. Even more preferably, both modulators M1 and M2 are driven so as to either rotate at different speeds in the same direction or in opposite directions about common vertical axis A. The modulators M1 and M2 may be driven by (not precisely shown) gear rims Z1 and Z2 provided e.g. at the free lower end and the outer surface of outer modulator M1 and, respectively, at the free lower end and the inner surface of inner modulator M2. Depending on whether the two modulators M1 and M2 are driven to either rotate in the same direction at different speeds or in opposite directions, the rotary motion may be transferred from the inner gear rim to the outer gear rim or vice versa by means of one or more interposed gear wheels.

As clearly seen in the sectional plan view of FIG. 6, each of the two modulators M1 and M2 is formed e.g. as two sections $KZ_{M1}$ and $KZ_{m2}$, respectively, of a sphere and as segments of not-closed hemispherical bodies so that sections $KZ_{M1}$ and $KZ_{M2}$, respectively, each correspond to sectors on the surface of a sphere defined by two planes extending through the center M of the dome and intersecting at an inner angle $\alpha$ which, in the embodiment according to FIG. 6, is preferably 90°. Sections $KZ_{M1}$ and $KZ_{M2}$, respectively on the surfaces of modulators M1 and M2 are preferably black.

The temperature of modulators M1 and M2 which have the form of dome segments is measured with the aid of high-ohmic resistors TH, e.g. thermistors, that have been embedded in the modulators as seen in FIG. 5; voltage is taken off by means of slip rings. Temperature readings are required only if the radiation to be measured is in the thermal infra-red range above a wave length of about 3 $\mu$m. The temperature of the black sections $KZ_{M1}$ and $KZ_{M2}$ on modulators M1 and M2 is of relatively little importance for measuring operations below a wave length of 3 $\mu$m. For radiation having a wave length of more than 3 $\mu$m, modulators M1 and M2 may be prepared from a transparent material that is non-transmissive for radiation of a wave length above 3 $\mu$m; the dome, in this instance, consists of a material which is transmissive to radiation of a wave length m and might even transmit radiation below a wave length of above 3 $\mu$m. As a consequence of modulation, only radiation above a wave length of 3 $\mu$m will thus be detected.

According to a particularly preferred embodiment of the invention, the space below dome K, i.e. the space wherein highly sensitive low-inertia detector(s) D is (are) disposed, may be provided with a gas-tight hermetic seal and subsequently filled with a gas that is especially suited for measuring in the desired range of wave lengths, i.e. in the range above and below 3 $\mu$m.

While only a single embodiment of the present invention has been shown and described, it will be obvious that many changes and modifications may be made thereunto without departing from the spirit and scope of the invention.

What is claimed is:

1. A system for measuring electromagnetic radiation originating from the hemisphere corresponding to a solid angle of $2\pi$, comprising at least one low-inertia detector disposed below of a transmissive dome and two modulators in the shape of dome segments having a common vertical axis which are fitted to each other and means for rotating both of said modulators about the common vertical axis at different relative speed to each other so that the low-inertia detector is exposed to the average electromagnetic radiation from the entire hemisphere which is measured over time.

2. The system as set forth in claim 1, wherein said modulators are similarly designed.

3. The system as set forth in claim 1, wherein said modulators are differently designed.

4. The system as set forth in claim 1, including means for rotating said modulators in opposite directions about the common vertical axis at the same speed.

5. The system as set forth in claim 1, including means for rotating said modulators in opposite directions about the common vertical axis at a different speed.

6. The system as set forth in claim 1, wherein each of said modulators in the shape of dome segments comprises two equal-sized wing like sections of spherical bi-angles arranged diametrically on an assumed spherical surface, said sections correspond to sectors on the surface of spherical cones having identical angles and being of a black color.

7. The system as set forth in claim 6, wherein said identical inner angles are 90°.

8. The system as set forth in claim 1, wherein said modulators in the form of dome segments show a defined wave length dependent reflectivity.

9. The system as set forth in claim 1, wherein said modulators in the form of dome segments show a defined wave length dependent transmissivity.

10. The system as set forth in claim 1, wherein said modulators in the form of dome segments show a defined wave length dependent reflectivity and transmissivity.

11. The system as set forth in claim 1, wherein said modulators in the form of dome segments are provided with means for measuring the temperature thereof.

12. The system as set forth in claim 1, wherein the space below said dome accommodating the low-inertia detector is hermetically sealed so as to be gas-tight.

13. The system as set forth in claim 1, including means for rotating said modulators in the same direction.

14. The system as set forth in claim 1, including means for rotating said modulators in opposite directions.

* * * * *